(12) United States Patent
Haven et al.

(10) Patent No.: US 11,557,058 B2
(45) Date of Patent: Jan. 17, 2023

(54) MACHINE VISION-BASED METHOD AND SYSTEM TO FACILITATE THE UNLOADING OF A PILE OF CARTONS IN A CARTON HANDLING SYSTEM

(71) Applicant: Liberty Reach, Inc., Clearwater, ID (US)

(72) Inventors: G. Neil Haven, Clearwater, ID (US); Michael Kallay, Bellevue, WA (US)

(73) Assignee: Liberty Reach Inc., Clearwater, ID (US)

(*) Notice: Subject to any disclaimer, the term of this patent is extended or adjusted under 35 U.S.C. 154(b) by 0 days.

(21) Appl. No.: 17/852,482

(22) Filed: Jun. 29, 2022

(65) Prior Publication Data

US 2022/0327736 A1 Oct. 13, 2022

Related U.S. Application Data (63) Continuation of application No. 17/141,593, filed on Jan. 5, 2021, now Pat. No. 11,436,753, which is a continuation-in-part of application No. 17/020,910, filed on Sep. 15, 2020, now Pat. No. 11,461,926, which is a continuation of application No. 16/174,554, filed on Oct. 30, 2018, now Pat. No. 10,776,949.

(51) Int. Cl.
| | | |
|---|---|---|
| *G06T 7/73* | (2017.01) | |
| *G06T 7/00* | (2017.01) | |
| *B25J 9/16* | (2006.01) | |

(52) U.S. Cl.
CPC ............... *G06T 7/74* (2017.01); *B25J 9/1664* (2013.01); *B25J 9/1697* (2013.01); *G06T 7/0008* (2013.01); *G06T 2207/10028* (2013.01)

(58) Field of Classification Search
CPC ..................... G06T 7/74; G06T 7/0008; G06T 2207/10028; B25J 9/1664; B25J 9/1697
USPC .......................................................... 382/103
See application file for complete search history.

(56) References Cited

U.S. PATENT DOCUMENTS

| | | |
|---|---|---|
| 9,493,316 B2 | 11/2016 | Girtman et al. |
| 9,630,320 B1 | 4/2017 | Konolige et al. |
| (Continued) | | |

OTHER PUBLICATIONS

United States Patent and Trademark Office, Supplemental Notice of Allowability for U.S. Appl. No. 17/141,593 dated Jul. 20, 2022.

*Primary Examiner* — Wednel Cadeau
(74) *Attorney, Agent, or Firm* — Brooks Kushman P.C.

(57) ABSTRACT

A machine vision-based method and system to facilitate the unloading of a pile of cartons within a work cell are provided. The method includes the step of providing at least one 3-D or depth sensor having a field of view at the work cell. Each sensor has a set of radiation sensing elements which detect reflected, projected radiation to obtain 3-D sensor data. The 3-D sensor data including a plurality of pixels. For each possible pixel location and each possible carton orientation, the method includes generating a hypothesis that a carton with a known structure appears at that pixel location with that container orientation to obtain a plurality of hypotheses. The method further includes ranking the plurality of hypotheses. The step of ranking includes calculating a surprisal for each of the hypotheses to obtain a plurality of surprisals. The step of ranking is based on the surprisals of the hypotheses.

6 Claims, 7 Drawing Sheets

(56) References Cited

U.S. PATENT DOCUMENTS

| | | | |
|---|---|---|---|
| 9,630,321 B2 | 4/2017 | Bradski et al. | |
| 10,239,701 B2 | 3/2019 | Wicks et al. | |
| 10,315,866 B2 | 6/2019 | Yuvaraj et al. | |
| 10,662,007 B2 | 5/2020 | Yuvaraj et al. | |
| 2010/0262278 A1* | 10/2010 | Winkler | B65G 1/1378 700/214 |
| 2013/0329012 A1* | 12/2013 | Bartos | G06T 7/80 348/46 |
| 2016/0221187 A1 | 8/2016 | Bradski et al. | |
| 2018/0061043 A1 | 3/2018 | Bartos et al. | |
| 2019/0262994 A1 | 8/2019 | Yuvaraj | |
| 2020/0086437 A1 | 3/2020 | Johnson et al. | |
| 2020/0134860 A1 | 4/2020 | Haven et al. | |
| 2020/0234071 A1 | 7/2020 | Yuvaraj et al. | |
| 2020/0410712 A1 | 12/2020 | Haven et al. | |

* cited by examiner

$$p(g(h,v) \geq G) = 1 - CDF(g) = 1 - \int_0^{g(h,v)} p(x = G)dx$$

$$\mathbb{S}(\text{a structure}) = \sum_{g(h,v) \, \in \, \text{a structure}} -\ln p(g(h,v) \geq G)$$

MACHINE VISION-BASED METHOD AND SYSTEM TO FACILITATE THE UNLOADING OF A PILE OF CARTONS IN A CARTON HANDLING SYSTEM

CROSS-REFERENCE TO RELATED APPLICATIONS

This application is a continuation of U.S. patent application Ser. No. 17/141,593, filed Jan. 5, 2021, which is a continuation-in-part application to co-pending patent application Ser. No. 17/020,910 filed Sep. 15, 2020. That application is a continuation application of patent application Ser. No. 16/174,554, filed Oct. 30, 2018.

TECHNICAL FIELD

At least one embodiment of the present invention generally relates to machine vision-based methods and systems to facilitate the unloading of a pile or stack of cartons or boxes in a material handling system.

OVERVIEW

In certain applications it is desirable to move objects from one pallet or platform and place them into another pallet, tote, platform, or conveyance for reassembly and further processing. These objects are typically boxes of varying volumes and weights that must be placed into a receptacle or conveyor line based on a set of rules such as: size of object, size of destination tote or conveyance. Additional rules may be inferred based on printed material on the box, or additionally the kind of box. Box types can vary widely including partial openings in a box top, shape of the box top, whether or not the box is plain cardboard or has been printed. In material handling there are several processes for moving these kinds of objects. In a manual single box pick process, manual operators are presented an assembly of box-like objects and select an individual object to move from a plane or other conveyance to a tote or other conveyance for further processing. In an automated single box pick process the box handling is typically performed by a robot.

A decanting process builds on the single box picking process. Again, typically, manual labor is used to "decant" objects from a plane of objects. These objects are a set of box-like objects, that may or may not be adjacent to each other, that must be moved onto a conveyance or tote, either singly or as a group.

The pose of an object is the position and orientation of the object in space relative to some reference position and orientation. The location of the object can be expressed in terms of X, Y, and Z. The orientation of an object can be expressed in terms of Euler angles describing its rotation about the x-axis (hereinafter RX), rotation about the y-axis (hereinafter RY), and then rotation about the Z-axis (hereinafter RZ) relative to a starting orientation. There are many equivalent mathematic coordinate systems for designating the pose of an object: position coordinates might be expressed in spherical coordinates rather than in Cartesian coordinates of three mutually perpendicular axes; rotational coordinates may be express in terms of quaternions rather than Euler angles; 4×4 homogeneous matrices may be used to combine position and rotation representations; etc. But generally, six variables X, Y, Z, RX, RY, and RZ suffice to describe the pose of a rigid object in 3D space.

Automated single box pick and decanting have some clear issues that humans can easily overcome. For instance, a human might recognize easily that a box position is tipped, rotated, or otherwise not be in a preset location on the plane of boxes. Additionally, a human may easily see that only so many box objects can be moved at a time. Humans also would be able to quickly understand if one object were overlapping another and be able to still move the objects.

Unfortunately, both of the above-noted manual processes are repetitive and prone to burn out and injury for these workers. Manufacturers might also want to move these humans into more appropriate places to supervise automation or other important duties. Ideally, a processing plant would want to automate these processes thus reducing injury, labor shortage and to apply certain rules to the boxes.

In existing art, automated single box picking, or decanting require pre-known information about the arrangement and location of boxes through pre-defined parameters. These parameters must be setup in advance and do not allow for simple changes, or the introduction of new boxes without training or configuration. Other configurations rely on barcoding, or other identification methods that rely on known data about the boxes to determine location and size of boxes.

The automation may include the introduction of robotic systems, sensors, conveyors, or other automated techniques to improve object processing. There is no prior art that handles these kinds of systems without large cost in development and training or significant maintenance in adding new products.

These existing systems rely on either Classical Image Processing or Machine Learning are described hereinbelow.

A. Classical Image Processing

Figure 1:
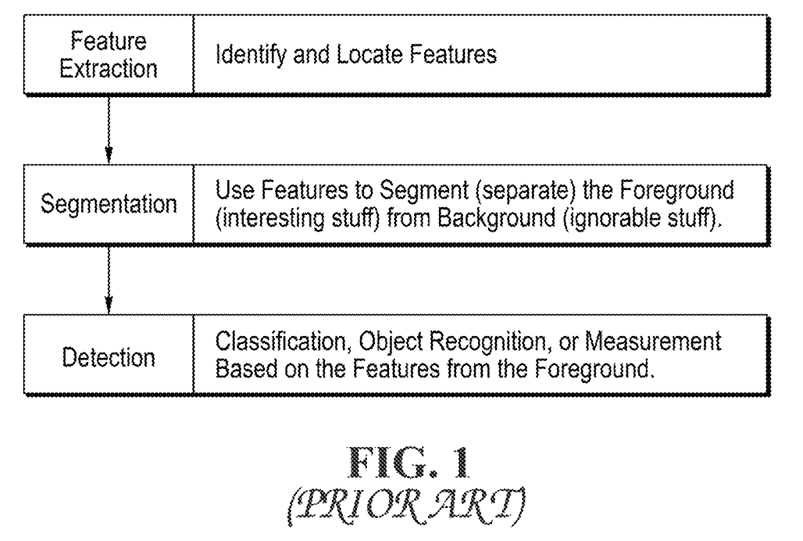
FIG. 1 is a block diagram flow chart which illustrates classical image processing.

Classical Image Processing is reliant on a dataset and is dependent on Feature Extraction, Segmentation and Detection to obtain information regarding an item of interest as shown in FIG. 1.

Feature extraction attempts to locate and extract features from the image. Segmentation processes use the extracted features to separate the foreground from the background to isolate the portion of an image with desirable data. The processes of feature extraction and segmentation may iterate to extract a final set of features for use in the detection phase. In the final detection phase, a classification, object recognition or measurement is given based on the features in the foreground.

Additionally, existing art requires systems to learn about reading print in a separate process that adds additional time and effort to detection of the desired objects.

Lastly, classical image processing depends on parameters that may be arbitrarily selected such as a percentage of depth and greyscale to determine features—which is error fraught. These kinds of additional parameters add complexity and error to the process.

B. Machine Learning

Alternatively, other systems that automate single box picking or decanting rely on some form of Machine Learning (ML) principles. These are a modern approach to interacting with unknown materials and can learn to classify objects based on a training set of data. Essentially these systems go through a process of identifying objects and asking if the result matches desired result (training). This process requires a large dataset and consumes a significant amount of time.

There are a couple of defects of this process: overtraining and duration of training.

The system must discover features during the training phase and look for things that are important to calculate about the images. Some of these features might include edge or color, or depth or gradients or some other feature that is known only to the training process. Humans gather this information by parallax. An additional downfall of this method is that the more types of input to the ML the longer the training phase.

Too little training on a ML will mean that the system does not have sufficient data for a trained set. Too much and the dataset will be oversized and degrade performance. A balance between the two is required and dependent on a holdout dataset to validate sufficient data.

An additional issue with ML training is accounting for new objects to be added into the process. Anytime a new object is introduced, or an existing object is changed, the system must be retrained for the new data.

The following U.S. patent publications are related to at least one embodiment of the present invention: 2016/0221187; 2018/0061043; 2019/0262994; 2020/0086437; 2020/0134860; 2020/0234071; U.S. Pat. Nos. 9,493,316; 9,630,320; 9,630,321; 10,239,701; 10,315,866; and 10,662,007.

SUMMARY OF EXAMPLE EMBODIMENTS

An object of at least one embodiment of the present invention is to provide a machine vision-based method and system which overcome the above-noted shortcomings of Classical Image Processing and/or ML to provide a faster, more reliable process and system.

Other objects of at least one embodiment of the present invention are to provide a machine vision-based method and system which:
Eliminate the time for training;
Eliminate the possibility of over or undertraining;
Eliminate the need to collect hundreds or thousands of samples for training;
Eliminate the need for retraining;
Speed up the process of identifying an item of interest;
Read printed boxes and unprinted boxes in the same framework; and/or
Unify all the sources of information about the item of interest without using arbitrarily selected parameters.

In carrying out the above objects and other objects of at least one embodiment of the present invention, a machine vision-based method to facilitate the unloading of a pile of cartons within a work cell in an automated carton handling system is provided. The method includes the step of providing at least one 3-D or depth sensor having a field of view at the work cell. The at least one sensor has a set of radiation sensing elements which detect reflected, projected radiation to obtain 3-D sensor data. The 3-D sensor data includes a plurality of pixels. For each possible pixel location and each possible carton orientation, the method includes generating a hypothesis that a carton with a known structure appears at that pixel location with that container orientation to obtain a plurality of hypotheses. The method further includes ranking the plurality of hypotheses. The step of ranking includes calculating a surprisal for each of the hypotheses to obtain a plurality of surprisals. The step of ranking is based on the surprisals of the hypotheses. At least one carton of interest is unloaded from the pile based on the ranked hypotheses.

The method may further include utilizing an approximation algorithm to unload a plurality of cartons at a time from the pile in a minimum number of picks.

The work cell may be a robot work cell.

The sensor may be a hybrid 2-D/3-D sensor.

The sensor may include a pattern emitter for projecting a known pattern of radiation and a detector for detecting the known pattern of radiation reflected from a surface of the carton.

The pattern emitter may emit a non-visible pattern of radiation and the detector may detect the reflected non-visible pattern of radiation.

The sensor may be a volumetric sensor capable of capturing thousands of individual points in space.

At least one of the hypotheses may be based on print on at least one of the cartons.

Further in carrying out the above objects and other objects of at least one embodiment of the present invention, a machine vision-based system to facilitate the unloading of a pile of cartons within a work cell in an automated carton handling system is provided. The system includes at least one 3-D or depth sensor having a field of view at the work cell. The at least one sensor has a set of radiation sensing elements which detect reflected, projected radiation to obtain 3-D sensor data. The 3-D sensor data including a plurality of pixels. The system also includes at least one processor to process the 3-D sensor data and, for each possible pixel location and each possible carton orientation, generate a hypothesis that a carton with a known structure appears at that pixel location with that container orientation to obtain a plurality of hypotheses. The at least one processor ranks the plurality of hypotheses. Ranking includes calculating a surprisal for each of the hypotheses to obtain a plurality of surprisals. Ranking is based on the surprisals of the hypotheses. The system further includes a vision-guided robot for unloading at least one carton of interest from the pile based on the ranked hypotheses.

The at least one processor may utilize an approximation algorithm so that the vision-guided robot unloads a plurality of cartons at a time from the pile in a minimum number of picks.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Preferably, one or more 3-D or depth sensors 32 (FIG. 16) of at least one embodiment of the invention measure distance via massively parallel triangulation using a projected pattern (a "multi-point disparity" method). The specific types of active depth sensors which are preferred are called multipoint disparity depth sensors.

"Multipoint" refers to the laser projector which projects thousands of individual beams (aka pencils) onto a scene. Each beam intersects the scene at a point.

"Disparity" refers to the method used to calculate the distance from the sensor to objects in the scene. Specifically, "disparity" refers to the way a laser beam's intersection with a scene shifts when the laser beam projector's distance from the scene changes.

"Depth" refers to the fact that these sensors are able to calculate the X, Y and Z coordinates of the intersection of each laser beam from the laser beam projector with a scene.

"Passive Depth Sensors" determine the distance to objects in a scene without affecting the scene in any way; they are pure receivers.

"Active Depth Sensors" determine the distance to objects in a scene by projecting energy onto the scene and then analyzing the interactions of the projected energy with the scene. Some active sensors project a structured light pattern onto the scene and analyze how long the light pulses take to return, and so on. Active depth sensors are both emitters and receivers.

For clarity, each sensor 32 is preferably based on active monocular, multipoint disparity technology as a "multipoint disparity" sensor herein. This terminology, though serviceable, is not standard. A preferred monocular (i.e. a single infrared camera) multipoint disparity sensor is disclosed in U.S. Pat. No. 8,493.496. A binocular multipoint disparity sensor, which uses two infrared cameras to determine depth information from a scene, is also preferred.

Figure 16:
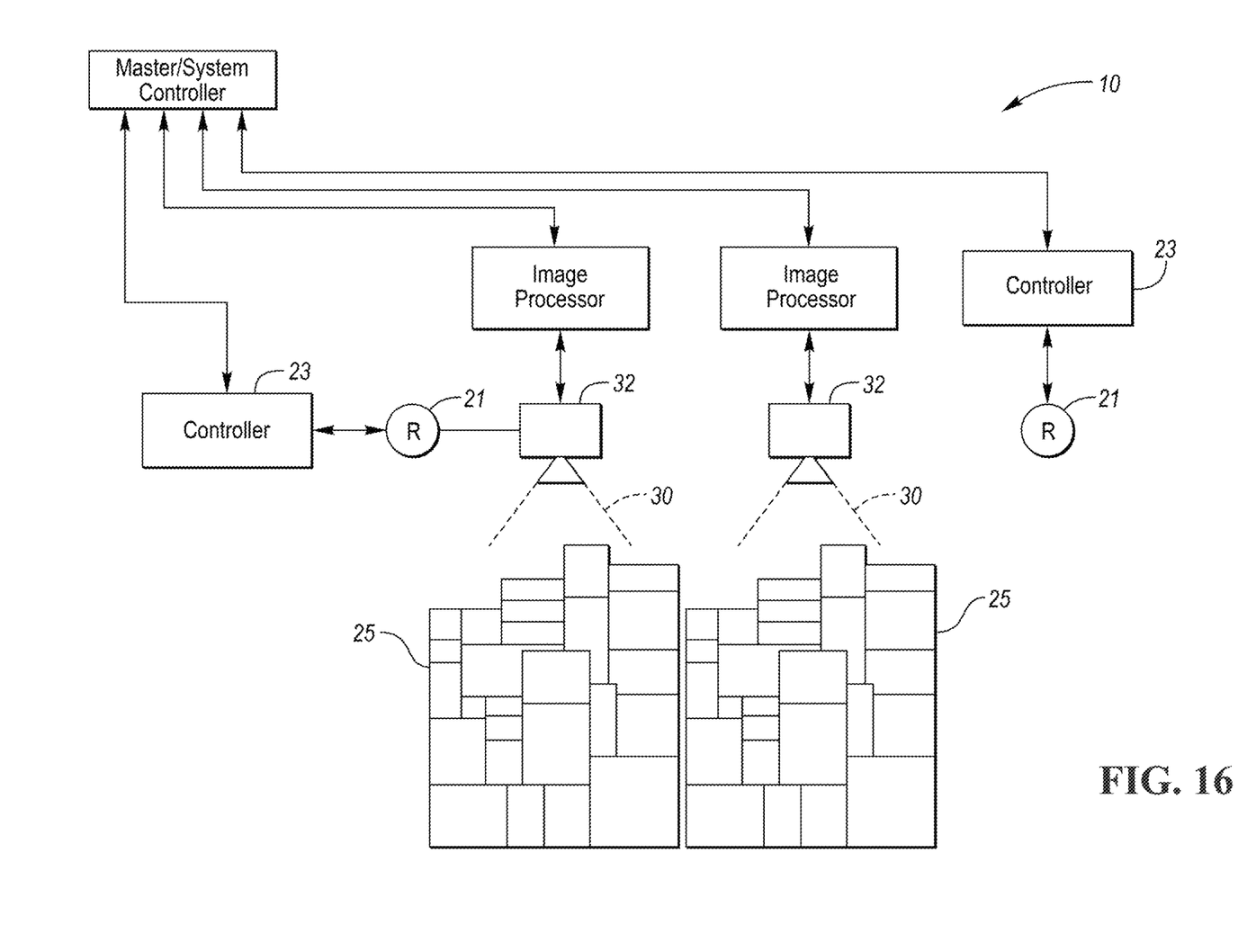
FIG. 16 is a schematic block diagram of a system constructed in accordance with at least one embodiment of the present invention.

Multiple volumetric sensors 32 may be placed in key locations around and above the piles or stacks of cartons 25 (FIG. 16). Each of these sensors 32 typically captures hundreds of thousands of individual points in space. Each of these points has a Cartesian position in space. Before measurement, each of these sensors 32 is registered into a common coordinate system. This gives the present system the ability to correlate a location on the image of a sensor with a real world position. When an image is captured from each sensor 32, the pixel information, along with the depth information, is converted by a computer into a collection of points in space, called a "point cloud".

Figure 2:
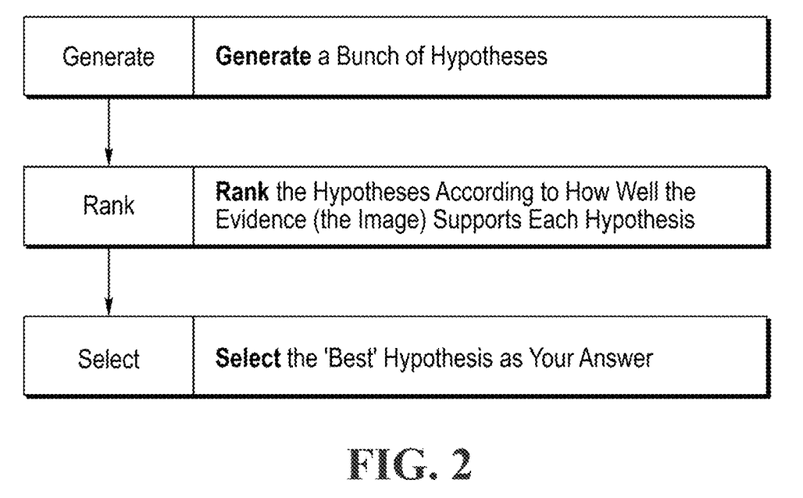
FIG. 2 is a block diagram flow chart which illustrates at least one embodiment of a machine vision-based method of the present invention.

In general, sources of information are unified in the same framework, so that they can be compared as commensurate quantities without using special parameters. This approach to image processing is generally noted as follows: Generate hypotheses. Rank how well each hypothesis matches the evidence, then select the 'best' hypothesis as the answer. This approach is very probabilistic in nature and is shown in the block diagram flow chart of FIG. 2.

Boxes or cartons as an example: What are the hypotheses in boxes?

A box is located at some h,v position with some orientation (h,v,r). For every position and possible orientation, a hypothesis is generated.

Ranking the hypotheses. For each hypothesis one calculates how improbable that the configuration arose by chance. One calculates probability to see if something shows up by random chance.

Explanation of Calculation

Figure 3:
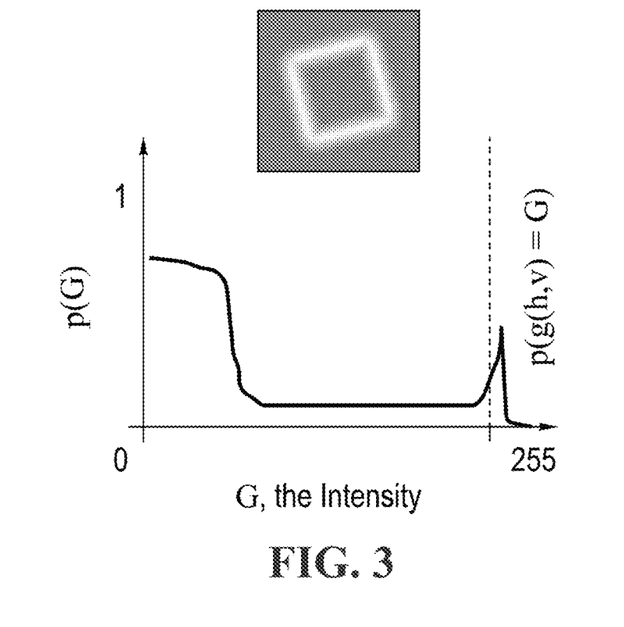
FIG. 3 is a graph of a probability histogram to determine the probability of observing a pixel with intensity g(h,v) and a top image of a box-like object.

Focus on intensity in the image and look just for the edge (strength of the edge). What is the probability that there is a pixel that bright? One could focus on the brightest pixels and calculate the probability of a histogram (i.e. probability histogram of FIG. 3) and normalize, which is not particularly useful.

Figure 4:
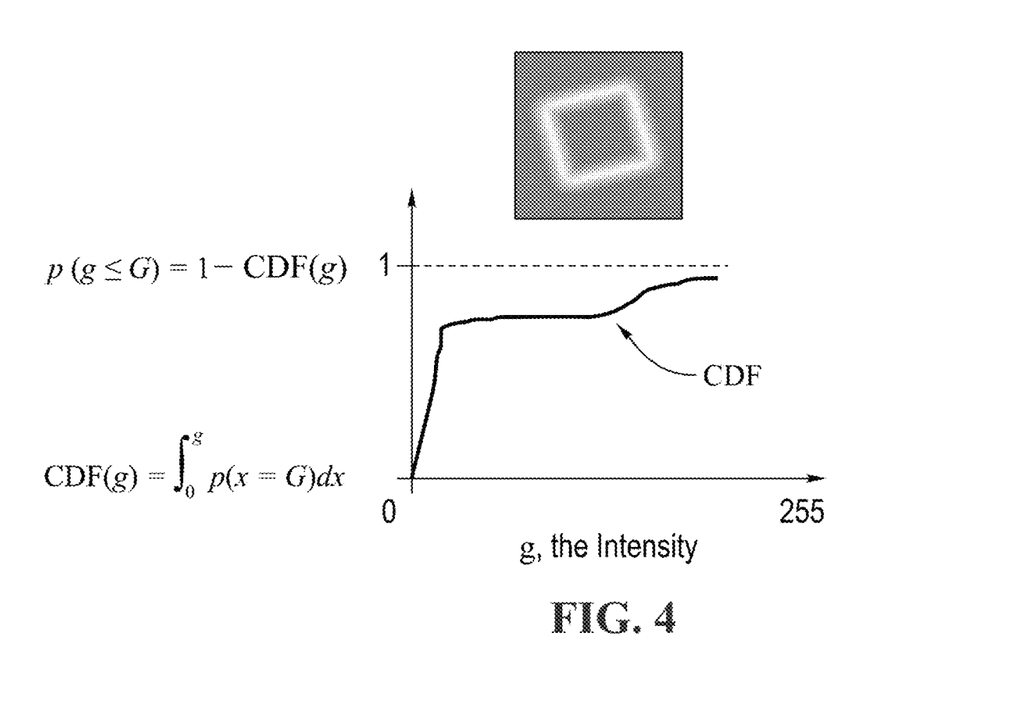
FIG. 4 is a graph of a cumulative probability histogram to determine the cumulative probability of seeing a pixel this bright or brighter, an equation for cumulative distribution function (CDF) and a top image similar to the image of FIG. 3.

One asks if there is a pixel with brightness equal to or greater than this pixel, which is a Cumulative Distribution Function (see the cumulative probability histogram of FIG. 4). Cumulative Distribution Functions, which are integrals of histograms, gives one the ability to observe the probability of one pixel. One looks at a histogram of one or more images and assign a probability to one particular pixel.

Then the probability of observing a pixel with intensity greater than or equal to the given value is 1-CDF(g).

Figure 5:
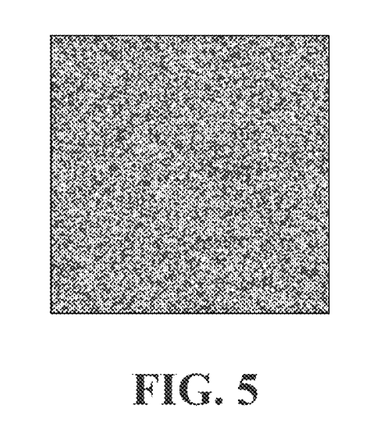
FIG. 5 is a top image illustrating random pixel selection.

If one pick pixels at random (see FIG. 5) from a histogram, one cannot get structure and will have just noise.

Figure 6:
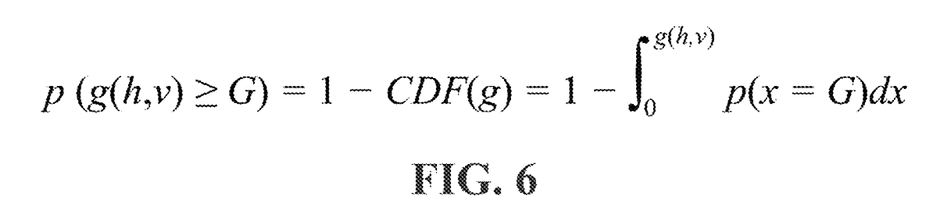
FIG. 6 illustrates a cumulative probability formula.

What is the probability of observing a pixel this bright or brighter? See the cumulative probability formula of FIG. 6.

If one takes the multiplication over the box, one can hypothesize where the box is and the orientation and do it for only one box. For each point and rotation of the image one can assign probability of the box being there. It requires a lot of computation to get this number. See the sharp edges of the box of FIG. 7.

Figure 7:
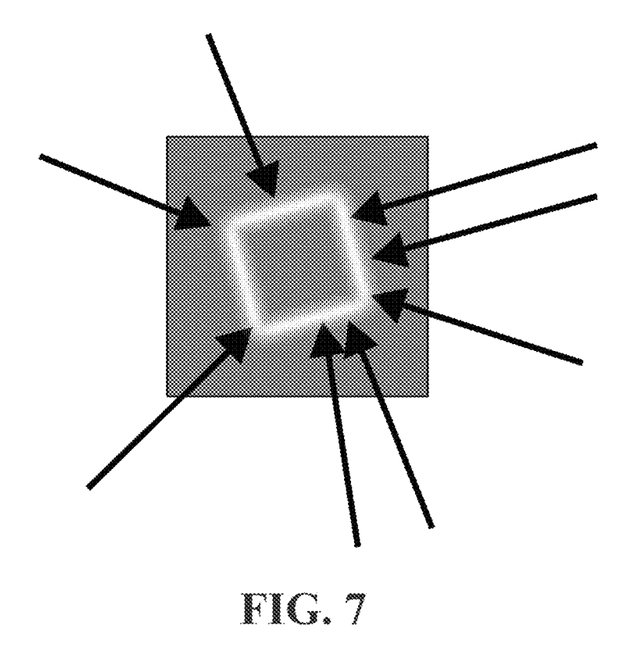
FIG. 7 is a top image similar to the images of FIGS. 3 and 4 with arrows to identify sharp edges in the image.

What is the probability of seeing all the pixels in that box together by chance? Assuming independent probabilities, the probability of observing a whole bunch of independent events together is the multiplication of the probabilities of the individual events. Pi means multiply all these things together. This quantity is the multiplication of a bunch of very small numbers. A low number means this configuration will not occur by random chance.

$$p(\text{that box}) = \prod_{g(h,v) \in \text{that box}} p(g(h, v) \geq G)$$

Figure 8:
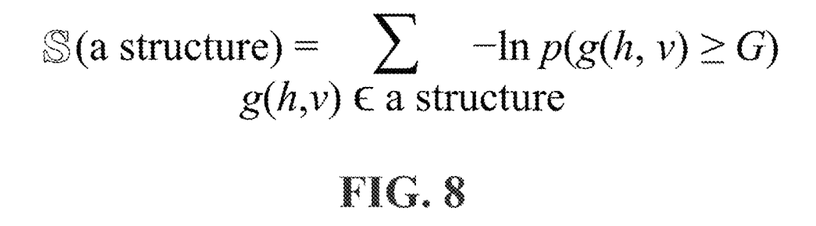
FIG. 8 illustrates a structure formula.

One does not do all the multiplication computations because they are numerically unstable. One calculates the entropy, (aka the surprisal), which is the negative log probability of the number or observation. Negative log is entropy, which allows for addition instead of multiplication, therefore one works in surprisal which makes probability more accurate and faster. (See FIG. 8)

One could just as easily have done this same thing working on the intensity image, volume, or any other feature like print, rather than the edge image. The algorithm does not care what features one is looking at.

Figure 9:
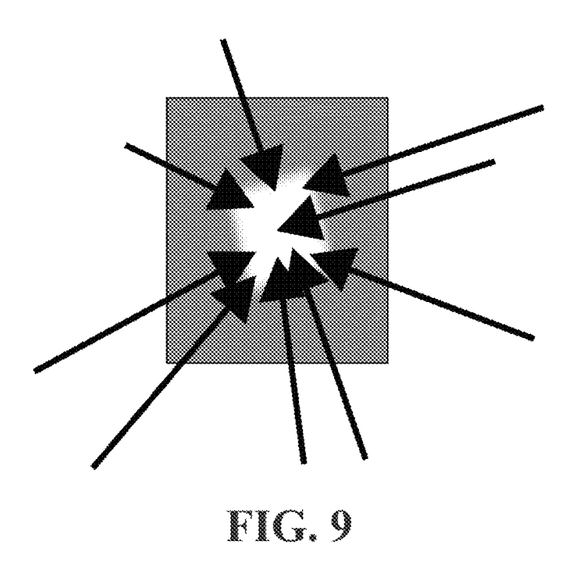
FIG. 9 is a top image similar to the images of FIGS. 3 and 4 with arrows to identify various surface points.

The distribution of the random variable, G, is found by observation. The algorithm is good enough that observation of a single image is sufficient, but by continuously updating the CDF as we go, the performance of the algorithm improves Using classical methods, if one were looking at the surface points of FIG. 9, one might use a morphological structuring element the size of the box and perform some morphology and then threshold to a binary image, then perform connected components to look for something of the correct shape.

Figure 10:
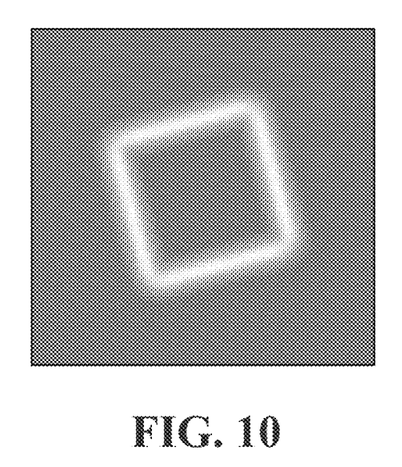
FIG. 10 is a top image similar to the images of FIGS. 3 and 4 wherein line segment detection may be performed.
Figure 11:
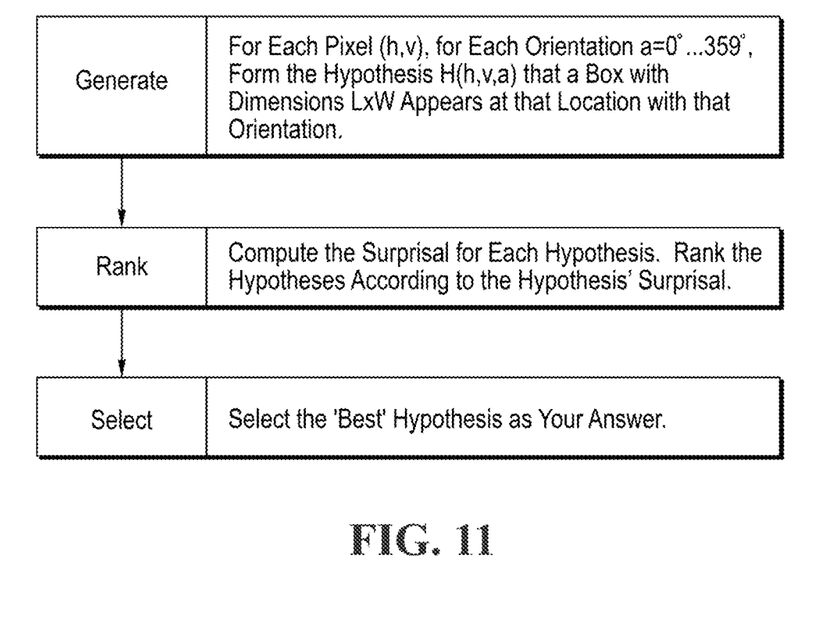
FIG. 11 is a block diagram flow chart similar to the chart of FIG. 2 for a box likelihood evaluation algorithm.

If one were to look at FIG. 10, one might perform some line segment detections, perhaps using a Hough transform then a threshold, then try to assemble a box from the line segments. Note the threshold parameters. At least one embodiment of the present invention eliminates the parameters in favor of a maximum computation on the entropy image: aside from the structuring model of FIG. 8, there are no parameters.

Also, consider what happens if one uses grayscale gradients, but then one wants to add depth gradients as a second source of information. How does one add these quantities together? The classical approach to image processing has no answer for this question. Only the present approach of this application has a ready answer: multiply the probabilities (add the Surprisals). In this approach one could use a whole image, or depth image, or greyscale, or any image.

Figure 12:
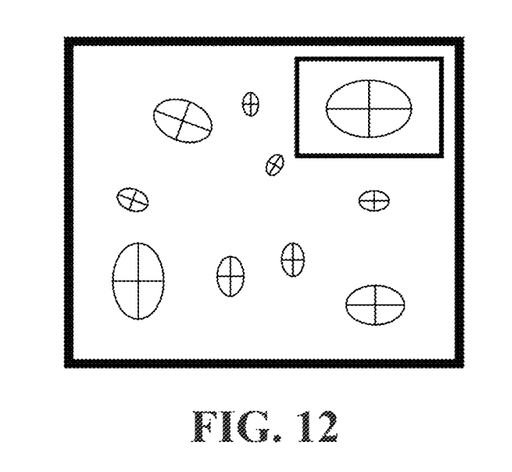
FIG. 12 is a schematic diagram which illustrates the select or selection step of FIG. 11.
Figure 13:
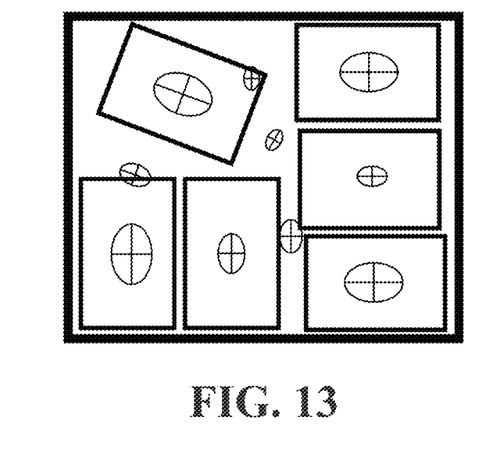
FIG. 13 is a schematic diagram which illustrates a multi-box parse algorithm.
Figure 14:
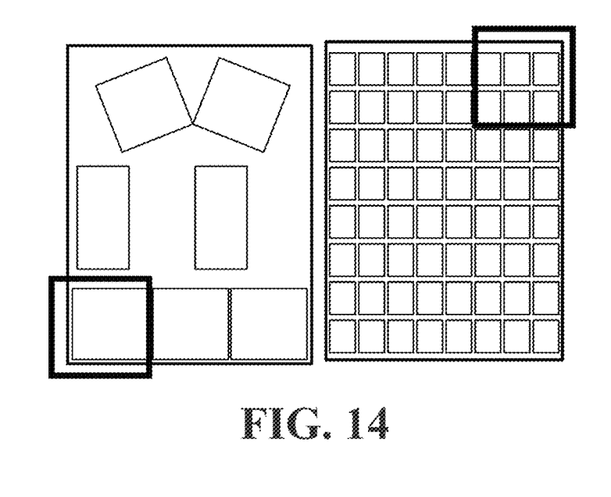
FIG. 14 are schematic diagrams which illustrate legal picks in a pallet decomposition algorithm.
Figure 15:
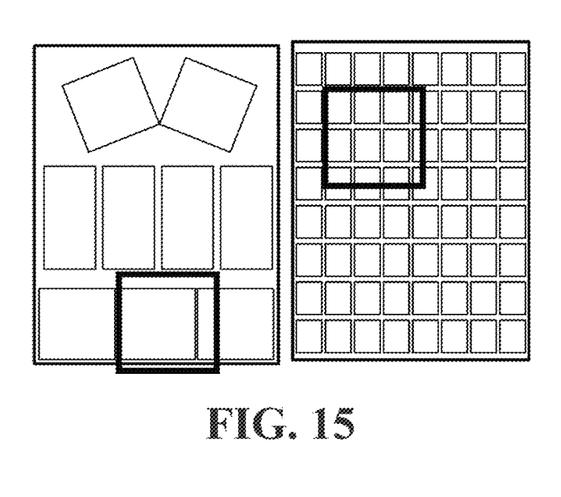
FIG. 15 are schematic diagrams which illustrate illegal picks in the pallet decomposition algorithm.

Algorithm 1: Box Likelihood Evaluation
Generate: For each pixel (h,v), for each box orientation a=0-359 degrees of (h,v), generate a hypothesis H(h,v,a) that a box with dimensions L×W appears at that location, with that orientation.
Rank: Compute the surprisal for each hypothesis. Rank the hypotheses according to Surprisals. Bigger surprisal means it is a better chance box or organization of chance value.
Select: Get the best hypothesis. (Single box pick) Very unlikely to see a tie.
Algorithm 2: Multibox Parse
Decanting: In Multibox Parse, one does not do the select phase, one does not care about the best box. One needs to know where all the boxes are. Visually, the Surprisal hypothesis is represented in FIG. 12 by size and orientation of the oval.
For Single Box Pick one simply picks the strongest hypothesis from FIG. 12.
For Multibox Parse: one must take the same information and find all the boxes.
Select a set of hypotheses to look for consistence. Boxes need to be disjoint, cannot overlap.
Sum of the suprisals of the hypothesis is maximum.
Hypotheses that are consistent and maximum.
This is an NP hard problem. No known polynomial time solution; cannot verify in polynomial time.
One can find an approximate solution in polynomial time.
One solves with an approximation method like Simulated Annealing algorithm but multiple methods for approximating the optimum answer will present themselves.
Algorithm 3: Pallet Decomposition
The algorithm for Pallet Decomposition will ideally partition a layer of boxes such that the number of partitions is minimal—one wants to empty the layer of boxes, by picking multiple boxes at a time, in the minimum number of picks.
Decomp Sequence of legal picks to empty a layer.
Optimal decomposition is a decomposition with minimum number of picks.
Find an optimum decomposition for a layer.
NP Hard, so we will be using approximation like Branch and Bound algorithm.
A legal pick does not overlap existing boxes. Pick tool does not overlay any box partially.
Illegal picks have tool picking overlapping boxes.
Algorithm 4: Reading Printed Data
Look at the boxes on the outside of the pallet (especially boxes in corners) that have strong signals in both the edge grayscale gradient and depth gradient surprisal matrices.
Boxes on the corners are identifiable by just the depth and edge grayscale surprisal matrices.
Once one has identified the corner boxes using the gradient information, one can 'look at' the print on corner boxes—that is one can segregate visual data comprising the image of the print from the visual data generated by the edges of the boxes.

Features of at Least One Embodiment of the Invention

1) Calculate Maximum Likelihood through surprisal. Use surprisal to unify treatment of all sources of information.

2) Describe HDLS using multipoint disparity sensors such as Kinect sensors available from Microsoft Corporation. Since one combines grayscale and depth in common probabilistic framework, it is important to insure steadiness of distributions. One wants isolation from ambient illumination, so find a source to overwhelm ambient. Efficiency is obtained by using the IR sensors twice: once for disparity and once for grayscale. Each sensor is configured to alternate between acquisition of disparity (depth) and grayscale information. Thus, one uses the same hardware for two purposes. The wavelength of disparity sensors operates at frequency of fabret-perot IR laser at 830 nm. LED and laser diode sources are commercially available at 850 nm but not 830 nm. One uses special source at 850 nm, along with wide band pass filter between 830 (disparity) and 850 HDLS.

3) No/Eliminate training. Use known structure of boxes to eliminate training session for ML Use of orthogonal projection allows one to treat all boxes the same. Use length, width, depth for grayscale and depth information. No matter how far away the boxes are or orientation, with orthogonal projection one knows that it is a box without the need for training.

4) Use gradient image of printed box. Use as additional information to improve the likelihood of correctly identifying boxes on the interior of the pallet which may not have significant depth gradient because they are packed together.

The system includes vision-guided robots 21 and one or more cameras 32 having a field of view 30. The cameras 32 and the robots 21 may be mounted on support beams of a support frame structure of the system 10 or may rest on a base. One of the cameras 32 may be mounted on one of the robots 21 to move therewith.

The vision-guided robots 21 have the ability to pick up any part within a specified range of allowable cartons using multiple-end-of-arm tooling or grippers. The robots pick up the cartons and orient them at a conveyor or other apparatus. Each robot 21 precisely positions self-supporting cartons on a support or stage.

The robots 21 are preferably six axis robots. Each robot 21 is vision-guided to identify, pick, orient, and present the carton so that they are self-supporting on the stage. The grippers 17 accommodate multiple part families.

Benefits of Vision-based Robot Automation include but are not limited to the following:

Smooth motion in high speed applications;
Handles multiple cartons in piles 25 of cartons;
Slim designs to operate in narrow spaces;
Integrated vision; and
Dual end-of-arm tooling or grippers 17 designed to handle multiple carton families.

A master control station or system controller (FIG. 16) determines locations and orientations of the cartons or boxes in the pile or stack of cartons using any suitable machine vision system having at least one camera (i.e. camera 32). Any one or more of various arrangements of vision systems may be used for providing visual information from image processors (FIG. 16) to the master controller. In one example, the vision system includes two three-dimensional cameras 32 that provides infrared light over fields of vision or view 30. In various embodiments, the light may be infrared.

In some embodiment, multiple cameras such as the cameras 32 can be situated at fixed locations on the frame structure at the station, or may be mounted on the arms of the robot 21. Two cameras 32 may be spaced apart from one another on the frame structure. The cameras 32 are operatively connected to the master controller via their respective image processors. The master controller also controls the robots of the system through their respective robot controllers. Based on the information received from the cameras 32, the master controller then provides control signals to the robot controllers that actuate robotic arm(s) or the one or more robot(s) 21 used in the method and system.

The master controller can include a processor and a memory on which is recorded instructions or code for communicating with the robot controllers, the vision systems, the robotic system sensor(s), etc. The master controller is configured to execute the instructions from its memory, via its processor. For example, master controller can be host machine or distributed system, e.g., a computer such as a digital computer or microcomputer, acting as a control module having a processor and, as the memory, tangible, non-transitory computer-readable memory such as read-only memory (ROM) or flash memory. The master controller can also have random access memory (RAM), electrically-erasable, programmable, read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the master controller can include all software, hardware, memory, algorithms, connections, sensors, etc., necessary to monitor and control the vision subsystem, the robotic subsystem, etc. As such, a control method can be embodied as software or firmware associated with the master controller. It is to be appreciated that the master controller can also include any device capable of analyzing data from various sensors, comparing data, making the necessary decisions required to control and monitor the vision subsystem, the robotic subsystem, sensors, etc.

An end effector on the robot arm may include a series of grippers supported to pick up the cartons. The robotic arm is then actuated by its controller to pick up the cartons with the particular gripper, positioning the gripper 17 relative to the cartons using the determined location and orientation from the visual position and orientation data of the particular vision subsystem including its camera and image processor.

In general, the method and system of at least one embodiment of the present invention searches for objects like boxes or cartons which have high variability in shape, size, color, printing, barcodes, etc. There is lots of differences between each object, even of the same type and one needs to determine location of the boxes that may be jammed very close together, without much discernible feature. The method combines both 2D and 3D imaging (grayscale and depth) to get individuation of the objects. The objects may all "look" the same to a human, but have high variability between each assembled box or carton.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A machine vision-based method to facilitate the unloading of at least one item supported on a pallet, the method comprising the steps of:

providing at least one 3-D or depth sensor having a field of view, the at least one sensor having a set of radiation sensing elements which detect reflected, projected radiation to obtain 3-D sensor data, the 3-D sensor data including a plurality of pixels;

for each possible pixel location and each possible item orientation, generating a hypothesis that an item with a known structure appears at that pixel location with that orientation to obtain a plurality of hypotheses; and ranking the plurality of hypotheses wherein the step of ranking includes calculating a surprisal for each of the hypotheses to obtain a plurality of surprisals and wherein the step of ranking is based on the surprisals of the hypotheses.

2. The method as claimed in claim 1, further comprising utilizing an algorithm to unload a plurality of items from the pallet.

3. The method as claimed in claim 1, wherein at least one of the hypotheses is based on print on the at least one item.

4. A machine vision-based system to facilitate the unloading of at least one item supported on a pallet, the system comprising:

at least one 3-D or depth sensor having a field of view, the at least one sensor having a set of radiation sensing elements configured to detect reflected, projected radiation to obtain 3-D sensor data, the 3-D sensor data including a plurality of pixels;

at least one processor configured to process the 3-D sensor data and, for each possible pixel location and each possible item orientation, generate a hypothesis that an item with a known structure appears at that pixel location with that item orientation to obtain a plurality of hypotheses; and the at least one processor configured to rank the plurality of hypotheses wherein ranking includes calculating a surprisal for each of the hypotheses to obtain a plurality of surprisals and wherein the ranking is based on the surprisals of the hypotheses.

5. The system as claimed in claim 4, wherein the at least one processor utilizes an algorithm to unload a plurality of items from the pallet.

6. The system as claimed in claim 4, wherein at least one of the hypotheses is based on print on the at least one item.

* * * * *